United States Patent [19]

Ramamurthy et al.

[11] Patent Number: 5,204,032
[45] Date of Patent: Apr. 20, 1993

[54] PROCESS FOR SUBSTANTIALLY ELIMINATING SURFACE MELT FRACTURE DURING EXTRUSION OF THERMOPLASTIC POLYMERS

[75] Inventors: Arakalgud V. Ramamurthy, East Windsor; Mahmoud R. Rifi, Kendall Park, both of N.J.

[73] Assignee: Union Carbide Chemicals & Plastics Technology Corporation, Danbury, Conn.

[21] Appl. No.: 366,477

[22] Filed: Jun. 15, 1989

[51] Int. Cl.⁵ .............................................. B29C 47/00
[52] U.S. Cl. .................................... 264/85; 264/211; 264/564; 524/272; 524/274
[58] Field of Search ...................... 264/85, 176.1, 211, 264/564; 524/270, 272, 274

[56] References Cited

U.S. PATENT DOCUMENTS

| | | | |
|---|---|---|---|
| 3,869,416 | 3/1975 | Hoh | 524/272 |
| 4,127,546 | 11/1978 | Lundberg et al. | 524/274 |
| 4,522,776 | 6/1985 | Ramamurthy | 264/176.1 |
| 4,552,712 | 11/1985 | Ramamurthy | 264/85 |
| 4,554,120 | 11/1985 | Ramamurthy | 264/85 |

OTHER PUBLICATIONS

Harris, G. "Rosin and Rosin Derivatives." in: Encyclopedia of Chemical Technology, vol. 11, pp. 779–810.

*Primary Examiner*—Leo B. Tentoni
*Attorney, Agent, or Firm*—C. J. Vicari

[57] ABSTRACT

A process for substantially eliminating surface melt fracture during extrusion of a thermoplastic polymer such as a molten narrow molecular weight distribution, linear, ethylene copolymer, by incorporating into the thermoplastic polymer a wood rosin or wood rosin derivative.

9 Claims, No Drawings

PROCESS FOR SUBSTANTIALLY ELIMINATING SURFACE MELT FRACTURE DURING EXTRUSION OF THERMOPLASTIC POLYMERS

FIELD OF THE INVENTION

This invention relates to a process for substantially eliminating melt fracture, particularly surface melt fracture, during extrusion of thermoplastic polymers susceptible to melt fracture, under conditions of flow rate and melt temperature which would otherwise produce such melt fracture.

In a more specific aspect, the invention relates to a process for substantially eliminating surface melt fracture during extrusion of a molten narrow molecular weight distribution, linear, ethylene copolymers, under conditions of flow rate and melt temperature which would otherwise produce such melt fracture.

BACKGROUND OF THE INVENTION

Most commercial low density polyethylenes are polymerized in heavy walled autoclaves or tubular reactors at pressures as high as 50,000 psi and temperatures up to 300° C. The molecular structure of high pressure low density polyethylene is highly complex. The permutations in the arrangement of its simple building blocks are essentially infinite. High pressure resins are characterized by an intricate long chain branched molecular architecture. These long chain branches have a dramatic effect on the melt rheology of the resins. High pressure low density polyethylene resins also possess a spectrum of short chain branches generally 1 to 6 carbon atoms in length which control resin crystallinity (density). The frequency distribution of these short chain branches is such that, on the average, most chains possess the same average number of branches. The short chain branching distribution characterizing high pressure low density polyethylene can be considered narrow.

The term "linear" is defined as identifying a polymer chain which is predominantly free of long chain branching By "predominantly free of long chain branching" is meant less than 0.5 branches/per 1000 carbon atoms in the polyethylene molecule. "Long chain branching" characterizes branching within polymeric structures which exceeds short branch lengths of pendant groups derived from individual alpha-olefin comonomers. A long chain branch of polyethylene should have at least a sufficient number of carbon atoms to provide significant modifications in rheological behavior, such as caused by chain entanglement. The minimum number of carbon atoms is usually greater than about 100. Short chain branching introduced through comonomer polymerization provides branch lengths of usually less than about 10 carbon atoms per branch. Non-crosslinked linear low density polyethylene (LLDPE) possesses little, if any, long chain branching such that the only branching to speak of is short chain branching, with such branch length controlled by the pendant chain length of the comonomeric alpha-olefins provided.

The term "narrow molecular weight distribution" as used herein refers to the ratio of weight average molecular weight to number average molecular weight. This ratio can be between 1 and about 10, preferably between about 2 to about 6.5, and most preferably between about 3 to about 5. The lower limit of this ratio is defined by the theoretical limit since number average molecular weight cannot exceed weight average molecular weight by definition.

Low density polyethylene can exhibit a multitude of properties. It is flexible and has a good balance of mechanical properties such as tensile strength, impact resistance, burst strength, and tear strength. In addition, it retains its strength down to relatively low temperatures. Certain resins do not embrittle at temperatures as low as −70° C. Low density polyethylene has good chemical resistance, and it is relatively inert to acids, alkalis, and inorganic solutions. It is, however, sensitive to hydrocarbons, halogenated hydrocarbons, and to oils and greases. Low density polyethylene has excellent dielectric strength.

More than 50% of all low density polyethylene is processed into film. This film is primarily utilized in packaging applications such as for meat, produce, frozen food, ice bags, boilable pouches, textile and paper products, rack merchandise, industrial liners, shipping sacks, pallet stretch and shrink wrap. Large quantities of wide heavy gauge film are used in construction and agriculture.

Most low density polyethylene film is produced by the tubular blown film extrusion process. Film products made by this process range in size, from tubes which are about two inches or less in diameter, and which are used as sleeves or pouches, to huge bubbles that provide a lay flat of up to about twenty feet in width, and which, when slit along an edge and opened up, will measure up to about forty feet in width.

Polyethylene can also be produced at low to medium pressures by homopolymerizing ethylene or copolymerizing ethylene with various alpha-olefins using heterogeneous catalysts based on transition metal compounds of variable valence. These resins generally possess little, if any, long chain branching and the only branching to speak of is short chain branching. Branch length is controlled by comonomer type. Branch frequency is controlled by the concentration of comonomer(s) used during copolymerization. Branch frequency distribution is influenced by the nature of the transition metal catalyst used during the copolymerization process. The short chain branching distribution characterizing transition metal catalyzed low density polyethylene can be very broad.

Linear low density polyethylene can also be produced by high pressure techniques as is known in the prior art.

U.S. Pat. No. 4,302,566 in the names of F. J. Karol et al and entitled Preparation of Ethylene Copolymers in Fluid Bed Reactor, discloses that ethylene copolymers, having a density of 0.91 to 0.96, a melt flow ratio of greater than or equal to 22 to less than or equal to 32 and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. Pat. No. 4,302,565 in the names of G. L. Goeke et al and entitled Impregnated Polymerization Catalyst, Process for Preparing, and Use for Ethylene Copolymerization discloses that ethylene copolymers, having a density of 0.91 to 0.96, a melt flow ratio of greater than or equal to 22 to less than or equal to 32 and a relatively low residual catalyst content can be produced in granular form, at relatively high productivities, if the monomer(s) are copolymerized in a gas phase process with a specific high activity Mg-Ti-containing complex catalyst which is impregnated in a porous inert carrier material.

The polymers as produced, for example, by the processes of said patents using the Mg-Ti containing complex catalyst possess a narrow molecular weight distribution, Mw/Mn, of about greater than or equal to 2.7 or less than or equal to 4.1.

The occurrence of melt fracture during extrusion of high molecular weight ethylene polymers having a narrow molecular weight distribution have been discussed extensively in U.S. Pat. Nos. 4,522,776; 4,552,712; and 4,554,120 the contents of which are incorporated herein by reference. Thus, U.S. Pat. No. 4,522,776, issued to A. V. Ramamurthy on Jun. 11, 1985 eliminates melt fracture by using a die having a die land surface fabricated of a material which increases adhesion between the die land surface and the polymer.

U.S. Pat. No. 4,552,712 issued to A. V. Ramamurthy on Nov. 12, 1985 reduces melt fracture by using a die having a die land region fabricated from stainless steel and wherein the length of the die land to the width of the die gap is about 35:1 to about 60:1.

U.S. Pat. No. 4,554,120 issued to A. V. Ramamurthy on Nov. 19, 1985 substantially eliminates surface melt fracture by using a die having a die land region defining opposing surfaces at least one of which is fabricated from an alloy containing 5 to 95 parts by weight zinc and 95 to 5 parts by weight copper.

Films suitable for packaging applications must possess a balance of key properties for broad end use utility and wide commercial acceptance. These properties include film optical quality, for example, haze, gloss, and see through characteristics. Mechanical strength properties such as puncture resistance, tensile strength, impact strength, stiffness, and tear resistance are important. Vapor transmission and gas permeability characteristics are important considerations in perishable goods packaging. Performance in film converting and packaging equipment is influenced by film properties such as coefficient of friction, blocking, heat sealability and flex resistance. Low density polyethylene has a wide range of utility such as in food packaging and non food packaging applications. Bags commonly produced from low density polyethylene include shipping sacks, textile bags, laundry and dry cleaning bags and trash bags. Low density polyethylene film can be used as drum liners for a number of liquid and solid chemicals and as protective wrap inside wooden crates. Low density polyethylene film can be used in a variety of agricultural and horticultural applications such as protecting plants and crops, as mulching, for storing of fruits and vegetables. Additionally, low density polyethylene film can be used in building applications such as a moisture or moisture vapor barrier. Further, low density polyethylene film can be coated and printed for use in newspapers, books, etc.

Possessing a unique combination of the aforedescribed properties, high pressure low density polyethylene is the most important of the thermoplastic packaging films. It accounts for about 50% of the total usage of such films in packaging. Films made from the polymers of the present invention, preferably the ethylene hydrocarbon copolymers, offer an improved combination of end-use properties and are especially suited for many of the applications already served by high pressure low density polyethylene.

An improvement in any one of the properties of a film such as elimination or reduction of surface melt fracture or an improvement in the extrusion characteristics of the resin or an improvement in the film extrusion process itself is of the utmost importance regarding the acceptance of the film as a substitute for high pressure low density polyethylene in many end use applications.

SUMMARY OF THE INVENTION

In accordance with the present invention, there is provided a process for substantially eliminating surface melt fracture during extrusion of a molten narrow molecular weight distribution, linear, ethylene copolymer, under conditions of flow rate and melt temperature which would otherwise produce such surface melt fracture which comprises incorporating into said ethylene copolymer a resin selected from wood rosin or derivatives thereof in an amount sufficient to substantially eliminate surface melt fracture during extrusion of said copolymer.

In a still broader aspect of the invention, in addition to the ethylene polymers recited herein, the practice of the present invention is also applicable to thermoplastic polymers which experience surface melt fracture during extrusion at flow rates and melt temperatures which produce such melt fracture. Examples of thermoplastic materials in which surface melt fracture can be observed include polypropylene, polystyrene, styrene butadiene-styrene, polyvinylchloride, polyacrylonitrile, ethylene propylene rubbers and like polymers.

Thus, in a broader aspect the present invention provides a process for substantially eliminating surface melt fracture during extrusion of a thermoplastic polymer under conditions of flow rate and melt temperature which would otherwise produce such melt fracture which comprises incorporating into said thermoplastic polymer a resin selected from wood rosin or derivatives thereof in an amount sufficient to substantially eliminate surface melt fracture during extrusion of said thermoplastic polymer.

In addition in a preferred operative mode, it is desirable to minimize moisture content in the resin entering the extruder. This can be accomplished by hopper dryers, or use of an inert gas such as nitrogen in the hopper or preferably at the throat of the extruder or hopper.

The present invention also provides a composition comprising a narrow molecular weight distribution, linear ethylene copolymer and from about 0.5% to about 5% based on the weight of said copolymer of wood rosin or a wood rosin derivative.

Description of the Preferred Embodiment

Dies

Advantageously, the molten ethylene or thermoplastic polymer can be extruded through a die such as a spiral annular die, slit die, etc., preferably an annular die, having a narrow die gap up to about 50 mils and preferably about 5-40 mils. Advantageously, when processing LLDPE resins, it is no longer required to extrude the molten ethylene polymer through a die having a die gap of greater than about 50 mils to less than about 120 mils, as described in U.S. Pat. No. 4,243,619. Conventionally, die land region construction has been largely based on nickel or chrome plated steel surfaces.

In general the type dies used can be as described in U.S. Pat. No. 4,552,712 issued Nov. 12, 1985.

WOOD ROSIN OR DERIVATIVES THEREOF

Wood rosin has been known and been available for many years. For a comprehensive description of it reference is made to the article entitled, "Rosin and Rosin Derivatives" found in Encyclopedia of Chemical Technology, Volume 11, published by Interscience Encyclopedia Incorporated at Pages 779-810. As therein set forth, wood rosin is obtained from the aged virgin pine stump and is composed of about 90 percent resin acid and about 10 percent of non-acidic material. The resin acids are monocarboxylic acids of alkylated hydrophenanthrene nuclei having two double bonds and an empirical formula of $C_{19}H_{29}COOH$. In turn, the acids can be classified into two groups, the abietic type and the pimaric type, each of which exists and is usually present in wood rosin in several isomeric and mixed forms. Also, as therein stated the non-acidic material in wood rosin is composed of a major amount of fatty acid esters.

Wood rosin derivatives are also useful in the present invention. The most common of the derivatives are the polyol esters (e.g., ethylene glycol, di and triethylene glycol, glycerol, oentaerythritol, and mixtures thereof). However, other derivatives such as dimerized, polymerized, or disproportionated wood rosin are also useful herein. Similarly, while not essential, the wood rosin or its derivative can be highly stabilized, i.e., stripped of volatiles and hydrogenated.

Wood rosins and their polyol esters useful in the present invention are those such as sold by Hercules Incorporated under the "FORAL" trademark. Among others, these include the following: "FORAL" A and "FORAL" AX which are characterized as being thermoplastic acidic resins produced by hydrogenating wood rosin to an exceptionally high degree, and having softening points (by the Hercules drop method) of 75° C. and acid numbers of 160; "FORAL" 85 which is characterized as being a highly stabilized ester rosin having a softening point of 81° C. and an acid number of 9; "FORAL" 105 characterized as being thermoplastic ester resin derived from pentaerythritol and a highly stabilized rosin base, and having a softening point of 103° C. and an acid number of 12; and resin S 1267 characterized as being a hydrogenated glycerol ester of wood rosin.

In general, the amount of rosin employed can vary from about 0.05% to about 5% preferably about 2% to about 3% based on the weight of the polymer composition. The rosin can be added to the thermoplastic polymer in the composition used for forming the polymer prior to polymerization utilizing well known conventional techniques. Thus the rosin additives can be added together with other known additives such as pigments, lubricants, slip agent, antioxidants, stabilizers, modifiers, and similar materials.

Film Extrusion

I. Blown Film Extrusion

The films formed as disclosed herein may be extruded by tubular blown film extrusion process. In this process a narrow molecular weight distribution polymer is melt extruded through an extruder. This extruder may have an extrusion screw therein with a length to diameter ratio of between 15:1 to 21:1, as described in U.S. Pat. No. 4,343,755 in the names of John C. Miller et al and entitled "A Process For Extruding Ethylene Polymers". This patent discloses that this extrusion screw contains a feed, transition and metering section. Optionally, the extrusion screw can contain a mixing section such as that described in U.S. Pat. Nos. 3,486,192; 3,730,492 and 3,756,574, which are incorporated herein by reference. Preferably, the mixing section is placed at the screw tip.

The extruder which may be used herein may have a 18:1 to 32:1 length to internal diameter barrel ratio. The extrusion screw used in the present invention may have a length to diameter ratio of 15:1 to 32:1. When, for example, an extrusion screw of a length to diameter ratio of 18:1 is used in a 24:1 extruder, the remaining space in the extrusion barrel can be partially filled with various types of plugs, torpedoes, or static mixers to reduce residence time of the polymer melt.

The extrusion screw can also be of the type described in U.S. Pat. No. 4,329,313. The molten polymer is then extruded through a die, as will hereinafter be described.

The polymer is extruded at a temperature of about 163° C. to about 260° C. The polymer is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion to the tubular film. The degree of expansion, as measured by the ratio of the fully expanded tube circumference to the circumference of the die annulus, is in the range 1:1 to 6:1 and preferably, 1:1 to 4:1. The tubular extrudate is cooled by conventional techniques such as, by air cooling, water quench or mandrel.

The drawdown characteristics of the polymers disclosed herein are excellent. Drawdown, defined as the ratio of the die gap to the product of film gauge and blow up ratio, is kept less than about 250. Very thin gauge films can be produced at high drawdown from these polymers even when said polymer is highly contaminated with foreign particles and/or gel. Thin gauge films of about 0.5 to 3.0 mils can be processed to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. "Splittiness" reflects crack propagation rate. It is an end-use characteristic of certain types of film and is not well understood from a fundamental perspective.

As the polymer exits the annular die, the extrudate cools and its temperature falls below its melting point and it solidifies. The optical properties of the extrudate change as crystallization occurs and a frost line is formed. The position of this frost line above the annular die is a measure of the cooling rate of the film. This cooling rate has a very marked effect on the optical properties of the film produced herein.

The ethylene polymer can also be extruded in the shape of a rod or other solid cross section using the same die geometry for only the external surface. Additionally, the ethylene polymer can also be extruded into pipe through annular dies.

II. Slot Cast Film Extrusion

The films formed as disclosed herein may also be extruded by slot cast film extrusion. This film extrusion method is well known in the art and comprises extruding a sheet of molten polymer through a slot die and then quenching the extrudate using, for example, a chilled casting roll or water bath. The die will hereinafter be described. In the chill roll process, film may be extruded horizontally and laid on top of the chill roll or it may be extruded downward and drawn under the chill roll. Extrudate cooling rates in the slot cast process are very high. Chill roll or water bath quenching is so fast that as the extrudate cools below its melting point, crystallites nucleate very rapidly, supramolecular structures have little time to grow and spherulites are held to a very small size. The optical properties of slot cast film are vastly improved over those characterizing films using the slower cooling rate, tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rates than practiced in the blown film process. The higher temperatures reduce shear stresses in the die and raise the output threshold for surface melt fracture.

Film

The film produced by the method of the present invention has a thickness of greater than about 0.10 mils to about 20 mils, preferably greater than about 0.10 to 10 mils, most preferably greater than about 0.10 to 4.0 mils. The 0.10 to 4.0 mil film is characterized by the following properties: a puncture resistance value of greater than about 7.0 in-lbs/mil; an ultimate elongation of greater than about 400%, tensile impact strength of greater than about 500 to about 2000 ft-lbs/in$^3$ and tensile strength greater than about 2000 to about 7000 psi.

Various conventional additives such as slip agents, antiblocking agents, and antioxidants can be incorporated in the film in accordance with conventional practice.

The Ethylene Polymers

The polymers which may be used in the process of the present invention are homopolymers of ethylene or copolymers of a major mol percent (greater than or equal to 80%) of ethylene, and a minor mol percent (less than or equal to 20%) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene 1, hexene-1, 4-methylpentene-1 and octene-1.

The ethylene polymers have a melt flow ratio of about greater than or equal to 18 to less than or equal to 50, and preferably of about greater than or equal to 22 to less than or equal to 30.

The homopolymers have a density of about greater than or equal to 0.958 to less than or equal to 0.972 and preferably of about greater than or equal to 0.961 to less than or equal to 0.968. The copolymers have a density of about greater than or equal to 0.85 to less than or equal to 0.96 and preferably greater than or equal to 0.917 to less than or equal to 0.955, and most preferably, of about greater than or equal to 0.917 to less than or equal to 0.935. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about greater than or equal to 0.96. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

When made in the fluid bed process, polymers of the present invention are granular materials which have a settled bulk density of about 15 to 32 pounds per cubic foot and an average particle size of the order of about 0.005 to about 0.06 inches.

For the purposes of making film in the process of the present invention, the preferred polymers are the copolymers and particularly those copolymers having a density of about greater than or equal to 0.917 to less than or equal to 0.924; and a standard melt index of greater than or equal to 0.1 to less than or equal to 5.0.

The Propylene Polymers

The propylene polymers which can be used in the process of the present invention, span a melt flow range (measured according to ASTM-1238 Condition L) from about 0.1 to 100g/10min. and are from among polypropylene homopolymers with an isotatic index (insoluble with reflux in heptane over a 24 hour period) greater than or equal to 85%, random copolymers with a total major molar percent of greater than or equal to 85% of propylene and a minor molar percent of less than or equal to 15% of ethylene and/or one or more of $C_3$ to $C_8$ alpha olefins and block (or impact copolymers) with a total major weight percent from about 70 to about of propylene and a minor weight percent from about 5 to about 30% of ethylene and/or one or more of $C_3$ to $C_8$ alpha olefins.

The process of the present invention is also applicable to extrusion of thermoplastic resins for other than film making purposes. Thus in addition to reduction or elimination of surface melt fracture from films, the process can also be used to reduce or eliminate surface melt fracture in thin wall tubes, pipes etc which would otherwise be susceptible to surface melt fracture under conventional surface melt fracture conditions.

The films made in the process of the present invention have a thickness of greater than 0.1 mil to less than or equal to 10 mils and preferably of greater than 0.1 mil to less than or equal to 5 mils.

Having set forth the general nature of the invention, the following examples illustrate some specific embodiments of the invention. It is to be understood, however, that this invention is not limited to the examples, since the invention may be practiced by the use of various modifications.

EXAMPLE 1

This Example demonstrates the conventional procedure for extruding ethylene polymers into tubes.

An ethylene-butene copolymer was prepared in accordance with the procedure of U.S. Pat. No. 4,302,566 and which is available from Union Carbide Corporation. The copolymer also contained 2% by weight of a masterbatch designated DFDE 0054 also available from Union Carbide. The copolymer had a nominal density of 0.918 gm/cc, a nominal melt index of 1.0 decigrams/minute and a nominal melt flow ratio of 26. The copolymer was formed into a tube by passing the resin after removing moisture with nitrogen gas through a conventional 3 ½ inch diameter screw extruder having a polyethylene screw as described in U.S. Pat. No. 4,329,313 with a Maddock mixing section, and thence into a conventional hard chrome plated steel die having a 1.0 inch land, 6 inch die collar diameter and a die pin diameter normally of 5.91 inches to give a 45 mil die gap. The sides of the die land were parallel with the flow axis of the polymer melt. The resin was extruded for three hours through the die at a rate of 150 lbs/hr. and at a temperature of 226° C. A 1.5 mil film was fabricated at a blow up ratio of 2 and a frost line height of 12 inches employing a conventional due lip air ring. There was severe melt fracture observed on both surfaces of the tube during the entire extrusion period of three hours.

EXAMPLE 2

This Example demonstrates the effects of the addition of 1% of the additive to the polymer composition for extruding ethylene polymers into tubes.

An ethylene-butene copolymer was prepared in accordance with the procedure of U.S. Pat. No 4,302,566 and which is available from Union Carbide Corporation. The copolymer also contained 1% by weight of "FORAL 85" (glycerol ester of abietic acid) available from Hercules Incorporated. The copolymer had a nominal density of 0.918 gm/cc, a nominal melt index of 1.0 decigrams/minute and a nominal melt flow ratio of 26. The copolymer was formed into a tube by passing the resin after removing moisture with nitrogen gas through a conventional 3 ½ inch diameter screw extruder having a polyethylene screw as described in U.S. Pat. No. 4,329,313 with a Maddock mixing section, and thence into a conventional hard chrome plated steel die having a 1.0 inch land, 6 inch die collar diameter and a die pin diameter normally of 5.91 inches to give a 45 mil die gap. The sides of the die land were parallel with the flow axis of the polymer melt. The resin was extruded for three hours through the die at a rate of 150 lbs/hr. and at a temperature of 226° C. A 1.5 mil film was fabricated at a blow up ratio of 2 and a frost line height of 12 inches employing a conventional dual lip air ring. There was initially observed severe melt fracture which decreased during extrusion. Forty-five minutes after startup there was moderate melt fracture which did not change for the remainder of the extrusion period.

EXAMPLE 3

The procedure of Example 2 was repeated except that the concentration of "FORAL 85" was increased to 3% by weight.

There was no melt fracture observed after 10 minutes of extrusion and remained free of melt fracture for the remainder of the three hour extrusion period.

What is claimed is:

1. A process for substantially eliminating surface melt fracture during extrusion of narrow molecular weight distribution, linear ethylene copolymer under conditions of flow rate and melt temperature which would otherwise produce such melt fracture which comprises incorporating into said ethylene copolymer a wood rosin or a wood rosin derivative and thereafter extruding said ethylene copolymer containing said rosin or wood rosin derivative, said rosin or wood rosin derivative being employed in an amount sufficient to substantially eliminate surface melt fracture during extrusion of said ethylene copolymer.

2. A process according to claim 1 wherein said ethylene copolymer is subjected to an inert gas to remove moisture prior to extrusion.

3. A process according to claim 2 wherein said inert gas is nitrogen.

4. A process according to claim 1 wherein said wood rosin or wood rosin derivative is incorporated in said copolymer in an amount of about 0.5% to about 5% based on the weight of said polymer.

5. A process according to claim 1 wherein said wood rosin or wood rosin derivative is incorporated in said copolymer in an amount of about 2% to about 3% based on the weight of said polymer.

6. A process according to claim 1 wherein said copolymer is a copolymer of greater than or equal to 80 mol percent of ethylene and less than or equal to 20 mol percent of at least one $C_3$ to $C_8$ alpha olefin.

7. A process according to claim 4 wherein said wood rosin derivative is a glycerol ester of abietic acid.

8. A process for substantially reducing surface melt fracture during extrusion of a molten narrow molecular weight distribution, linear, ethylene copolymer, under conditions of flow rate and melt temperature which would otherwise produce such surface melt fracture which comprises incorporating into said copolymer a glycerol ester of abietic acid and thereafter extruding said copolymer, said glycerol ester being employed in an amount of about 0.5% to about 5% based on the weight of the copolymer.

9. A process according to claim 8 wherein said glycerol ester of abietic acid is incorporated into said copolymer in an amount of about 2% to about 3% based on the weight of said copolymer.

* * * * *